Patented May 12, 1931

1,805,247

UNITED STATES PATENT OFFICE

FRANKLIN ERNEST KIMBALL, OF LONG BEACH, CALIFORNIA

PROCESS OF PURIFYING SULPHURIC ACID

No Drawing.   Application filed August 14, 1930.   Serial No. 475,388.

This invention relates to the oxidation of organic matter and carbon in sulphuric acid by means of heat and air and has for its object to render the process more expeditious.

In various processes sulphuric acid containing organic matter and carbon is obtained from waste sulphuric acid sludge resulting from sulphuric acid treatment of petroleum distillates. Hitherto portions of this present organic matter and carbon in recovered sulphuric acid have been oxidized by agitation with air at elevated temperatures. Frequently the chemical nature of the organic matter present in recovered sulphuric acid is such that it is more readily oxidized by hot sulphuric acid than by air. This loss of sulphuric acid thereby resulting sometimes makes it impossible to oxidize sufficient of the organic matter to render the recovered acid fit for the treatment of gasoline, since the presence of too much organic matter causes the gasoline to unduly emulsify with the sulphuric acid.

Instead of depending solely upon the agency of heat and air for the oxidizing action I employ antimonous sulphate to assist the oxidation of the organic matter. By this means the oxidation, being rendered very much more energetic, is effected satisfactorily and with less reduction of the sulphuric acid.

It may be remarked that the antimonous sulphate alone will not oxidize the organic matter and does not therefore come under the category of oxidizing agents hitherto employed in processes of oxidation. It does not therefore render unnecessary the employment of air but facilitates its use in oxidizing the organic matter.

In the preferred form of my invention a continuous stream of sulphuric acid having 1% antimonous sulphate and organic matter is passed through a suitable vessel. At the same time a continuous current of air that has been heated to 500 degrees Fahrenheit is passed through the vessel. The sulphuric acid and air have separate means of ingress and egress into and from the vessel. Within the vessel the heated air agitates the sulphuric acid. The exiting air from the vessel is cooled to condense some sulphuric acid that has been evaporated. The condensed sulphuric acid is collected and continuously returned back to the vessel. The exiting sulphuric acid from the vessel is cooled as it flows out.

Although I have herein shown and described only one process of oxidizing organic matter in sulphuric acid in the presence of antimonous sulphate embodying my invention, it is understood that various changes and modifications may be made herein without departing from the spirit of the invention and the spirit and scope of the appended claims.

I claim:

1. The process of oxidizing organic matter and carbon in sulphuric acid consisting in the oxidizing action of air at elevated temperatures in the presence of antimonous sulphate.

2. The process of oxidizing organic matter and carbon in sulphuric acid consisting in dissolving one per cent of antimonous sulphate therein, continuously agitating the sulphuric acid in a suitable vessel by continuously supplying air at a temperature of 500 degrees Fahrenheit thereto, continuously supplying the sulphuric acid containing the antimonous sulphate thereto, continuously withdrawing sulphuric acid therefrom, continuously withdrawing air therefrom, cooling same, collecting condensed sulphuric acid and continuously returning it back to the vessel.

FRANKLIN ERNEST KIMBALL.